United States Patent Office 3,524,901
Patented Aug. 18, 1970

3,524,901
FLAME RETARDANT VINYL ESTERS CONTAINING ACRYLIC OR METHACRYLIC PHOSPHATE ESTERS
Daniel J. Najvar, Lake Jackson, Tex., assignor to The Dow Chemical Company, Midland, Mich., a corporation of Delaware
No Drawing. Filed Jan. 22, 1968, Ser. No. 699,354
Int. Cl. C08g 45/04, 45/14; C07f 9/02
U.S. Cl. 260—835                    19 Claims

ABSTRACT OF THE DISCLOSURE

Flame retardant thermosettable resins containing both phosphorus and halogen are prepared by reacting an unsaturated polyester with a polyepoxide resin, an unsaturated carboxylic acid and a reactive phosphate ester. The resin may be diluted with a polymerizable monomer to produce resins suitable for making reinforced plastic articles and the like.

BACKGROUND OF THE INVENTION

This invention relates to a process for producing novel thermosettable resin compositions having flame retardant properties, to the resin composition and to articles produced therefrom. Additionally it relates to resin compositions containing both halogen and phosphorus.

Plastic materials having flame retardant properties are of increasing interest and commercial importance. Quite a variety of additives are known for use with thermoplastics and in the area of thermoset resins, brominated bisphenol A based polyepoxide resins have found much favor. Additionally, halogen containing polycarboxylic acid anhydrides (e.g. chlorendic anhydride) also provide flame retardant properties when used as a curing agent for polyepoxide resins or to prepare polyesters. Certain fillers, notably antimony trioxide, are also commonly used. The "Handbook of Reinforced Plastics of the SPI," S. Oleesky, Reinhold Publishing Corporation, New York, 1964 discusses fire retardancy with such additives on pp. 204 and 205. In general relatively high levels of halogen content are needed to obtain flame retardancy, etc., however, the physical properties of the cured resin frequently suffer at high halogen levels. Also, as is pointed out in the handbook cited above, the monomer or styrene level of polyesters intended for flame-retardant applications should be kept at a low level of about 15 percent or below.

SUMMARY OF THE INVENTION

Accordingly, this invention provides a process for preparing thermosettable resins having flame retardant properties at higher monomer levels than previously used while maintaining superior physical properties. Also provided for are resin compositions having both halogen and phosphorus containing components chemically combined in the resin and the articles produced therefrom.

The thermosettable resins are prepared by reacting with an unsaturated polyester resin, the following:

(a) A polyepoxide resin or a mixture of polyepoxide resins wherein the resin contains more than one epoxide group per molecule, (b) An unsaturated carboxylic acid as hereinafter defined, and (c) A reactive trialkyl phosphate ester as hereinafter defined.

The halogen content is advantageously obtained by an appropriate choice of the above reactants, such as halogenated polyepoxide resins, halogen containing polycarboxylic acid anhydrides, halogen containing glycols and the like. The finished resin may then be admixed with a polymerizable monomer such as styrene. Advantageously, a polymerization inhibitor such as hydroquinone and a carboxylic acid/epoxide catalyst is added to the reaction mixture.

The novel resin compositions produced as above may contain from about 2.6 to about 12 percent by weight of halogen and from 0.8 to about 3 percent by weight of phosphorus wherein the percent by weight is based on the weight of resin composition. Preferably the halogen content ranges from 4 to 10 percent by weight. Resin composition is meant to include the weight of polymerizable monomer, if present. The resin compositions of this invention may be readily cured by the addition of a free radical generating catalyst and/or the application of heat.

DETAILED DESCRIPTION

In the practice of this invention, a wide selection of unsaturated polyesters is readily available or can be prepared by methods well known to the art. Generally, in the preparation of suitable polyesters, an $\alpha,\beta$-ethylenically unsaturated dicarboxylic acid such as maleic acid, fumaric acid, itaconic acid or the like is interesterified with an alkylene glycol or polyalkylene glycol having a molecular weight of up to 2000 or thereabouts. Frequently, dicarboxylic acids free of ethylenic unsaturation such as phthalic acid, isophthalic acid, tetrabromophthalic acid, chlorendic acid, adipic acid, succinic acid and the like may be employed within a molar range of 0.25 to as much as 15 moles per mole of the $\alpha,\beta$-unsaturated dicarboxylic acid. It will be understood that the appropriate acid anhydrides when they exist may be used and usually are preferred when available.

The glycol or polyhydric alcohol component of the polyester is usually stoichiometric or in slight excess with respect to the sum of the acids. The excess of polyhydric alcohol seldom will exceed 20–25 percent and usually is about 10 to 15 percent.

These unsaturated polyesters may be generally prepared by heating a mixture of the polyhydric alcohol with the dicarboxylic acid or anhydride in the proper molar proportions at elevated temperatures, usually at about 150° to 225° C. for a period of time ranging from about 1 to 5 hours. Polymerization inhibitors such as t-butyl catechol may be advantageously added. It is also possible to prepare unsaturated polyesters directly from the appropriate oxide rather than the glycol, e.g., propylene oxide can be used in place of the propylene glycol.

Preferred unsaturated polyesters for the practice of the present invention are prepared by reacting between about 10 to 25 percent molar excess of an alkylene glycol having the formula

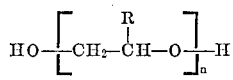

wherein R is H or a lower alkyl group and $n$ is an integer 1–4 with a mixture comprising about 1 to 6 parts by weight of an $\alpha,\beta$-unsaturated dicarboxylic acid or anhydride and about 6 to 1 parts by weight of a dicarboxylic acid or anhydride without ethylenic unsaturation. The condensation is effected at about 200° C. and continued until the acid content drops to about 2 to 12 percent. The polyester may then be cooled and admixed with a polymerizable monomer containing a $>C=CH_2$ group.

Any of the known polyepoxides can be employed in the preparation of the thermosetting resins of this invention. Useful polyepoxides are glycidyl polyethers of both polyhydric alcohols and polyhydric phenols, flame retardant epoxy resins based on tetrabromo bisphenol A, epoxy novolacs, epoxidized fatty acids or drying oil acids, epoxidized diolefins, epoxidized di-unsaturated acid esters as well as epoxidized unsaturated polyesters, so long as they contain more than one epoxide group per molecule. The polyepoxides may be monomeric or polymeric.

The polyepoxides referred to as epoxidized diolefins, epoxidized fatty acids, etc. are generally made by the known peracid method where the reaction is one of epoxidation of compounds with isolated double bonds at a controlled temperature so that the acid resulting from the peracid does not react with the resulting epoxide group to form ester linkages and hydroxyl groups. Preparation of polyepoxides by the peracid method is described in various periodicals and patents and such compounds as butadiene, ethyl linoleate, polyunsaturated drying oils or drying oil esters can all be converted to polyepoxides.

While the invention is applicable to epoxides generally, preferred polyepoxides are glycidyl polyethers of polyhydric alcohols or polyhydric phenols having weights per epoxide group of 150 to 2000. These polyepoxides are usually made by reacting at least about two moles of an epihalohydrin or glycerol dihalohydrin with one mole of the polyhydric alcohol or polyhydric phenol, and a sufficient amount of a caustic alkali to combine with the halogen of the halohydrin. The products are characterized by the presence of more than one epoxide group per molecule, i.e., a 1,2-epoxy equivalency greater than one.

The halogen content of the resin compositions of this invention is conveniently obtained by utilizing a halogen containing polyepoxide resin. Generally a halogenated polyhydric alcohol or phenol, such as tetrabromo bisphenol A is utilized to prepare the halogen containing polyepoxide resin. However, polyepoxide resins prepared as previously described may also be halogenated by known methods to introduce the halogen atom into the polyepoxide resins. The invention contemplates mixtures of halogen containing polyepoxides with polyepoxides having no halogen substituents. Preferably the halogen is bromine and/or chlorine.

The ethylenically unsaturated carboxylic acids useful in preparing the resin compositions of this invention include the $\alpha,\beta$-unsaturated monocarboxylic acids such as acrylic acid, methacrylic acid, the halogenated acrylic or methacrylic acids, cinnamic acid and the like and mixtures thereof, and the hydroxyalkyl acrylate or methacrylate half esters of dicarboxylic acids wherein the hydroxy-alkyl group preferably has from 2 to 6 carbon atoms. The dicarboxylic acids may be of both the ethylenic unsaturated type and those without ethylenic unsaturation. Preferably, the half ester is prepared by reacting substantially equal molar proportions of a hydroxyalkyl acrylate or methacrylate with a dicarboxylic acid anhydride. Advantageously, a polymerization inhibitor, such as hydroquinone, may be added since elevated temperatures are useful in preparing the half esters.

Dicarboxylic acid anhydrides containing ethylenic unsaturation suitable for preparing the half esters include maleic anhydride, the halogenated maleic anhydrides, citraconic anhydride, itaconic anhydride and the like and mixtures thereof. The saturated dicarboxylic acid anhydries include phthalic anhydride, tetrabromophthalic anhydride, chlorendic anhydride, anhydrides of aliphatic unsaturated dicarboxylic acids and the like.

The reactive trialkyl phosphate ester has the general formula

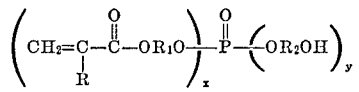

wherein R is hydrogen or methyl, $R_1$ is a bivalent alkyl group of 2 to about 4 carbon atoms, $R_2$ is the same as $R_1$ or a bivalent halogenated alkyl group of 2 to about 4 carbon atoms, $x$ and $y$ individually may be 1 or 2 and $x+y$ equals 3.

Generally the phosphate esters are prepared by reacting about 3 moles of a hydroxyalkyl acrylate or methacrylate with 1 mole of $P_2O_5$. Subsequently, the reaction products are reacted with about 3 moles of an alkylene oxide per mole of $P_2O_5$ to cap the free acid groups with a hydroxyalkyl group. Chemical combination of the phosphate ester into the resin can occur through the hydroxyl group. Further description of the phosphate esters and their process of manufacture is found in the copending application by Sampse R. Hargis, Ser. No. 699,288, filed on even date herewith.

Suitable phosphate esters include the following:

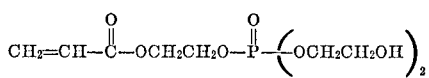

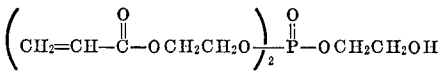

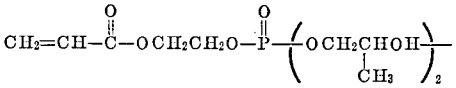

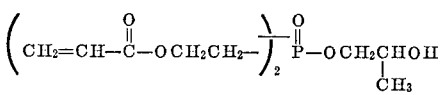

and the analagous methacrylate phosphate esters.

A wide selection of polymerizable monomers containing a $>C=CH_2$ group is available from the many known classes of vinyl monomers. Representative species are the vinyl aromatic compounds which include such monomers as styrene, vinyl toluene, halogenated styrenes, divinyl benzene and the like.

Other valuable monomers include the methyl, ethyl, isopropyl, octyl, etc. esters of acrylic acid or methacrylic acid; vinyl acetate, diallyl maleate, dimethallyl fumarate; acidic monomers such as acrylic acid, methacrylic acid and the like; and amide monomers such as acrylamide, N-alkyl acrylamides and the like and mixtures thereof.

Preferred polymerizable monomers containing a $$>C=CH_2$$

group are styrene, vinyl toluene, ortho-, meta- and para-halostyrenes, vinyl naphthalene, the various alpha-substituted styrenes, as well as the various di-, tri- and tetra-halo styrenes, and acrylic, methacrylic and crotonic acid esters which include both the saturated alcohol esters and the beta-hydroxyalkyl esters.

According to the present invention, the curing of the resin compositions is effected by the application of heat and/or pressure in the presence of a free radical yielding catalyst. Catalysts that may be used for the curing or polymerization are preferably the peroxide catalysts such as benzoyl peroxide, lauroyl peroxide, t-butyl hydroperoxide, methyl ethyl ketone peroxide, t-butyl perbenzoate, potassium persulfate and the like. The amount of the catalyst added will vary preferably from 0.1 percent to about 5 percent by weight of reactants. Temperatures employed may vary over a considerable range but usually are in the range of 60° to 250° C.

Additionally, more rapid curing of the thermosetting resin compositions may be accomplished by the addition of accelerating agents such as lead or cobalt naphthenate, dimethyl aniline and the like usually in concentrations ranging from 0.1 to 5.0 weight percent.

The self-extinguishing or flame retardant resins are prepared by mixing an unsaturated polyester resin with:

(a) A polyepoxide resin or a mixture of polyepoxide resins, (b) An unsaturated carboxylic acid in the proportions of about 0.5 to about 1.0 equivalents per equivalent of epoxide, and (c) A sufficient amount of a reactive phosphate ester or mixture of esters to provide about 0.8 to about 3 percent by weight of phosphorus based on the final resin composition:

The halogen content of the resin is advantageously provided by selecting appropriate proportions of a halogenated polyepoxide resin, for example. Alternately, a portion or all of the halogen may be derived from the polyester resin wherein a halogen substituted polycarboxylic anhydride or halogen substituted glycol or both is used in the preparation of said polyester. Further, the halogen may also be derived, at least in part, by the use of suitable halogen containing monomers such as chloro or bromo styrene, and the like.

The reactants may then be heated over a wide temperature range but preferably in the range of about 60° C. to about 130° C. Heating is continued until the percent acid concentration (as —COOH) is reduced to about 1 to 10 percent by weight. Advantageously, a catalyst to promote the epoxide-carboxylic acid reaction may be present. Such catalysts are well known and include amines such as 2,4,6-tri(dimethylamino methyl) phenol, amine salts, quanternary ammonium hydroxides or salts, and the like.

After cooling, the resin may be blended with a polymerizable monomer containing a >C=CH$_2$ group, although the resin is useful, as is, without the addition of the monomer. The proportion of monomer to resin will vary depending upon the degree of flame retardant characteristics and viscosity desired. The resin composition may comprise up to about 60 percent by weight monomer and at least about 40 percent by weight of resin solids.

Of additional advantage in the preparation of these thermosetting resin compositions is the addition of a vinyl polymerization inhibitor. Many such inhibtors are well known to the art and include hydroquinone, t-butyl catechol, 2,5-di-t-butylquinone and the like and are usually employed in the concentration range of about 0.005 to about 0.1 percent by weight of reactants.

The following non-limiting examples serve to illustrate the invention. All parts and percentages are by weight unless otherwise specified.

Resins and reactants utilized in the following examples include:

Polyepoxide A—A semi-solid resin prepared from tetrabromo bisphenol A and epichlorohydrin having an epoxide equivalent weight of about 350–400 and a bromine content of about 44–48%.

Polyepoxide B—A liquid resin prepared from bisphenol A and epichlorohydrin having an epoxide equivalent weight of 186–192.

DMP–30 refers to the epoxide/acid catalyst 2,4,5-tri-(dimethylaminomethyl) phenol.

HEAP is an abbreviation for a reactive phosphate ester prepared by reacting 41.2 lbs. of hydroxyethyl acrylate (containing 10.2 gms. hydroquinone, inhibitor) with 17.2 lbs. of P$_2$O$_5$. The P$_2$O$_5$ was added incrementally to the acrylate and the temperature controlled below about 30° C. After about 2 hours of reaction, 15.8 lbs. of ethylene oxide was added and reacted (under about 45 p.s.i.g. nitrogen pressure) while maintaining the temperature of reaction below about 55° C. Reaction was continued until the residual acid content was about 0.2%. For convenience this reactive phosphate ester will be identified as HEAP hereinafter.

MHE—A maleate half-ester was prepared by reacting about equal molar quantities of maleic anhydride and hydroxyethyl acrylate. For convenience, this half-ester will be identified as MHF hereinafter.

EXAMPLE 1

A polyester resin was prepared by charging to a suitable reactor having means for agitation, removed of water of condensation, temperature control, etc. 437 gms. phthalic anhydride, 290 gms. maleic anhydride and 500 gms. of propylene glycol. The mixture was reacted at 200° C. under a nitrogen purge until the acid content reached about 5.3%. The temperature of the polyester resin was lowered to 120° C. and 990 gms. of polyepoxide A added along with 0.72 gm. of hydroquinone. The temperature was lowered further to 100° C. and 3 gms. of DMP–30, 651 gms. of MHE and 814 gms. of HEAP added. The mixture was reacted at 120° C. until the acid content reached 3.7%. The reactor contents were then cooled to 105° C. and 1540 gms. of styrene added with mixing while cooling to ambient temperature. Additional styrene was then blended to give a final resin composition containing about 40% styrene. (The styrene contained 50 p.p.m. t-butyl catechol). The resin composition had a viscosity of 960 cps. at a 30% styrene level and 200 cps. at a 40% level.

A clear casting was made from the resin by curing with 1% benzoyl peroxide for 16 hours at 175° F. and 45 minutes at 250° F. The properties of the casting is summarized in Table II. Laminates about 1/16 inch in thickness were also prepared to contain about 27–28% chopped glass fibers. Resin compositions with varying styrene levels were utilized and burning rate tests were made according to the Globar ASTM Test No. D757–49 with the results recorded in Table III.

EXAMPLES 2–10

A series of resins were prepared according to the general procedure of Example 1. The compositions of these resins are shown in Table I. In all cases appropriate amounts of hydroquinone and DMP–30 were added. After dilution with styrene to a predetermined level clear castings and laminates were prepared and tested in a manner similar to Example 1 with the results recorded in Tables II and III.

Flexural strength and modulus was measured according to ASTM D790–59T; tensile strength and elongation by ASTM D638–58T; and heat distortion temperature by ASTM D1525–58T.

EXAMPLE 11

A polyester resin was prepared by reacting 364 gms. isophthalic acid and 400 gms. dipropylene glycol. This mixture was reacted, as before, to a 4.35% acid content at 235° C. and then 288 gms. fumaric acid and 134 gms. ethylene glycol added and reacted to a 3.7% acid content.

While cooling 990 gms. of polyepoxide A, 814 gms. HEAP, 650 gms. MHE, 0.72 gm. hydroquinone and 3 gms. DMP–30 were added and reacted to an acid content of about 3.5% at 120° C. After cooling the resin was diluted with styrene as in Example 1. Clear castings and laminates were prepared and tested, as before, and the results are recorded in Tables II and III.

TABLE I.—PROPORTIONS OF REACTANTS USED TO PREPARE THE RESINS OF THE EXAMPLES

| Example | Polyester Resin Proportion | | | | Polyepoxide | | Unsaturated Acid | | HEAP, gms. | Percent COOH[2] | Dilution monomer |
|---|---|---|---|---|---|---|---|---|---|---|---|
| | Phthalic anhy., gms. | Maleic anhy., gms. | Propylene glycol, gms. | Other glycol | A, gms. | B, gms. | MHE,[1] gms. | Acrylic acid, gms. | | | |
| 2 | 595 | 398 | 680 | | 990 | | | 216 | 814 | 3.9 | Styrene. |
| 3 | 266 | 177 | 303 | | 990 | 233 | 894 | | 814 | 3.0 | Do. |
| 4 | 360 | 240 | 410 | | 990 | 320 | 330 | 216 | 814 | 4.5 | Do. |
| 5 | 437 | 290 | 500 | | 1,010 | | 655 | | 1,420 | 3.3 | Styrene+MMA.[3] |
| 6 | 437 | 290 | 455 | [4] 41 | 990 | | 651 | | 814 | 3.7 | Styrene. |
| 7 | 790 | 520 | 820 | | 1,160 | 87 | | [5] 171 | 986 | 3.4 | Do. |
| 8 | 378 | 250 | | [6] 592 | 990 | | 651 | | 814 | 3.9 | Styrene+MMA. |
| 9 | 357 | 237 | 410 | | 576 | | 381 | | 540 | 1.8 | Styrene. |
| 10 | 465 | 310 | 530 | | 495 | | 322 | | 1,214 | 3.6 | Styrene+MMA. |

[1] Maleate half ester (see col. 6).
[2] Percent acid content before dilution with a polymerizable monomer.
[3] Mixture of styrene and methyl methacrylate (MMA).
[4] Glycerol.
[5] Maleic anhydride in place of acrylic acid.
[6] Neopentyl glycol.

TABLE II.—RESIN PHYSICAL PROPERTIES

| Property | Example Number | | | | | | | | | | |
|---|---|---|---|---|---|---|---|---|---|---|---|
| | 1 | 2 | 3 | 4 | [1] 5 | [2] 5 | 6 | 7 | 8 | 9 | [3] 10 | 11 |
| Flex strength, p.s.i. | 18,200 | 10,300 | 19,200 | 18,400 | 15,700 | 16,800 | 19,300 | 10,500 | 19,700 | 17,400 | 16,100 | 17,200 |
| After 2 hr. water boil | 9,300 | 8,800 | 8,500 | 10,200 | 7,900 | 9,800 | 10,000 | 9,500 | 9,300 | | 7,200 | 9,900 |
| Flex modulus, x 10⁵ p.s.i. | 4.6 | 4.8 | 4.6 | 4.5 | 4.0 | 4.3 | 4.85 | 4.75 | 5.1 | 3.7 | 4.36 | 4.5 |
| After 2 hr. water boil | 3.36 | 3.09 | 3.52 | 3.3 | 2.27 | 2.8 | 3.48 | 3.13 | 3.22 | | 1.97 | 3.5 |
| Tensile strength, p.s.i. | 10,000 | 9,500 | 10,800 | 8,700 | 9,400 | 9,900 | 11,300 | 9,700 | 8,200 | 9,500 | 9,100 | 10,300 |
| Elongation, percent | 2.5 | 2.3 | 4.85 | 1.95 | 4.5 | 3.6 | 5.35 | 1.92 | 1.85 | 1.9 | 6.7 | 4.24 |
| Heat distortion temp., 264 p.s.i., °F | 175 | 155 | 178 | 174 | 121 | 138 | 169 | | 154 | 160 | 153 | 157 |
| Barcol hardness | 43 | 42 | | 40 | 43 | 41 | 48 | 48 | | | 42 | |
| Viscosity, at 40% styrene, cps | 200 | 272 | 230 | 190 | | | | 475 | 250 | | 65 | 230 |

[1] 20% styrene, 20% methyl methacrylate.
[2] 30% styrene, 10% methyl methacrylate.
[3] 20% styrene, 20% methyl methacrylate.

TABLE III.—GLOBAR BURNING RATES

| Percent styrene | Burn rate, in./min. |
|---|---|
| Example: | |
| 1......30 | 0.145 |
| 35 | 0.165 |
| 40 | 0.205 |
| 45 | 0.213 |
| 2......30 | 0.203 |
| 35 | 0.195 |
| 40 | 0.213 |
| 45 | 0.224 |
| 3......30 | 0.130 |
| 35 | 0.146 |
| 40 | 0.167 |
| 45 | 0.230 |
| 4......40 | 0.208 |
| 5......20+20% methyl methacrylate (MMA) | 0.177 |
| 6......35 | 0.167 |
| 40 | 0.192 |
| 7......40 | 0.198 |
| 8......30 | 0.146 |
| 40 | 0.167 |
| 50 | 0.218 |
| 25.7+14.3% MMA | 0.187 |
| 9......40 | 0.344 |
| 10......20%+20% MMA | 0.271 |
| 25%+15% MMA | 0.312 |
| 30%+10% MMA | 0.354 |
| 35%+5% MMA | 0.415 |
| 11......30 | 0.193 |
| 35 | 0.218 |
| 40 | 0.218 |

EXAMPLE 12

By the procedure of Example 1 a resin was prepared wherein a dibromo neopentyl glycol having the formula

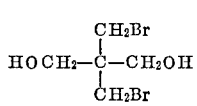

was used to prepare the polyester and provided the halogen content of the resin. The following reactants were utilized by the procedure of Example 1:

| | Gms. |
|---|---|
| Dibromo neopentyl glycol | 327 |
| Maleic anhydride | 59 |
| Phthalic anhydride | 89 |
| Hydrocarbon | 0.25 |
| DMP-30 | 1.6 |
| Polyepoxide B | 535 |
| Acrylic acid | 197 |
| HEAP | 316 |
| Styrene | 640 |

The resin was reacted to an acid content of about 2.6% before the styrene was added. The physical properties of clear castings are found in Table IV as well as the Globar Burn Rates.

The above resin was prepared with about a 1:1 equivalent ratio of carboxylic acid to epoxide. Similar results are obtained when the ratio is about 0.5:1.

EXAMPLE 13

Similar to Example 1 a resin was prepared using tetrabromo phthalic anhydride with the following reactants:

| | Gms. |
|---|---|
| Tetrabromo phthalic anyhdride | 580 |
| Maleic anhydride | 123 |
| Propylene glycol | 190 |
| Hydroquinone | 0.725 |
| DMP-30 | 3.5 |
| Polyepoxide B | 720 |
| MHE | 775 |
| HEAP | 632 |

The resin was reacted to an acid content of 3% and then, with cooling, 1255 gms. of styrene added and blended. The physical properties and Globar Burn Rates are recorded in Table IV.

TABLE IV.—RESIN PROPERTIES OF EXAMPLES 12 AND 13

| Property | Example 12 At 30% styrene | Example 12 At 35% styrene | Example 13 at 30% styrene |
|---|---|---|---|
| Flexural strength, p.s.i. | 14,200 | 17,700 | 18,700 |
| After 2 hr. water boil | 12,800 | 12,100 | 9,700 |
| Flexural Modulus×10⁵ | 4.7 | 4.8 | 4.9 |
| After 2 hr. water boil | 4.4 | 3.2 | 3.2 |
| Tensile strength, p.s.i. | 11,400 | 12,200 | 11,100 |
| Percent elongation | 3.7 | 4.0 | 5.1 |
| Heat distortion temp., °F. 264 p.s.i. | 156 | 154 | |
| Globar burn rate, in/min | 0.104 | ¹ 0.104 | 0.104 |
| | | ² 0.120 | ² 0.156 |

¹ At 35% styrene.
² At 40% styrene.

The thermosetting resin compositions of this invention are useful in the manufacture of pottings, castings, laminates and a variety of reinforced plastic articles. Said compositions wet glass, fibers and fillers rapidly, are easy to handle and apply. The rapid wetting of fillers provide improved holding capacity for a variety of fillers and reinforcing media as well as produce articles with smooth surfaces and excellent tensile and flexural properties. The resin compositions can be readily formulated to a thixotropic state by the incorporation of silica aerogel or expanded silicate and other such agents well known to the art. In addition to the aforesaid additives, other materials such as pigments, light stabilizers, mold release agents, etc. can be readily admixed.

While preferred embodiments to the invention have been disclosed, various modifications may be made therein without departing from the scope of the invention as set forth in the claims.

What is claimed is:

1. A process for producing a thermosettable resin having flame retardant properties which comprises
    (a) mixing an unsaturated polyester resin with (1) a polyepoxide resin or a mixture of polyepoxide resins having more than one epoxide group per molecule, (2) an unsaturated carboxylic acid in the proportions of about 0.5 to about 1 equivalent of acid per equivalent of epoxide, and (3) a reactive phosphate ester having the formula

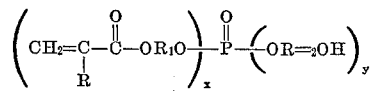

wherein R is hydrogen or methyl, $R_1$ is a bivalent alkyl group of 2 to about 4 carbon atoms, $R_2$ is the same as $R_1$ or a bivalent halogenated alkyl group of 2 to about 4 carbon atoms, $x$ and $y$ may be 1 or 2 and $x+y$ equals 3;
    (b) reacting said mixture until the acid concentration, as —COOH, is reduced to between about 1 and about 10 percent by weight based on resin solids; and
    (c) blending therewith a polymerizable monomer having a $>C=CH_2$ group in the proportion of up to about 60 percent by weight of said monomer and at least about 40 percent by weight of said resin;
    said resin prepared to contain about 0.8 to about 3 percent by weight of phosphorus based on resin composition and from about 2.6 to about 12 percent by weight of halogen based on resin composition.

2. The process of claim 1 wherein said reaction takes place over a temperature range of about 60° C. to about 130° C.

3. The process of claim 1 wherein said polyepoxide is a glycidyl polyether of tetrabromo bisphenol A.

4. The process of claim 1 wherein said polyepoxide is a mixture of a glycidyl polyether of tetrabromo bisphenol A and a glycidyl polyether of a polyhydric phenol.

5. The process of claim 1 wherein said unsaturated carboxylic acid is a hydroxyalkyl acrylate or methacrylate half ester of an ethylenically unsaturated dicarboxylic acid.

6. The process of claim 5 wherein said half ester is a hydroxyethyl acrylate half ester of maleic acid.

7. The process of claim 1 wherein said unsaturated carboxylic acid is acrylic acid.

8. The process of claim 1 wherein R of said phosphate ester is hydrogen, $R_1$ is —$CH_2CH_2$—, $R_2$ is —$CH_2CH_2$—, $x$ is 2 and $y$ is 1.

9. The process of claim 8 wherein $x$ is 1 and $y$ is 2.

10. A thermosettable resin composition having flame retardant properties which comprises
    (a) the reaction product of a mixture of an unsaturated polyester resin with
        (1) a polyepoxide resin or a mixture of polyepoxide resins having more than one epoxide group per molecule,
        (2) an unsaturated carboxylic acid in the proportions of about 0.5 to about 1 equivalent of acid per equivalent of epoxide and
        (3) a reactive phosphate ester having the formula

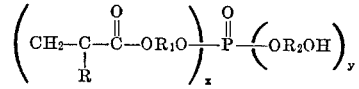

wherein R is hydrogen or methyl, $R_1$ is a bivalent alkyl group of 2 to about 4 carbon atoms, $R_2$ is the same as $R_1$ or a bivalent halogenated alkyl group of 2 to about 4 carbon atoms, $x$ and $y$ may be 1 or 2 and $x+y$ equal 3;
    (b) a polymerizable monomer having a $>C=CH_2$ group in the proportions of up to about 60 percent by weight of said monomer and at least about 40 percent by weight of said resin reaction product;
    said resin prepared to contain about 0.8 to about 3 percent by weight of phosphorus based on resin composition and about 2.6 to about 12 percent by weight of halogen based on resin composition.

11. The composition of claim 10 wherein said polyepoxide is a glycidyl polyether of tetrabromo bisphenol A.

12. The composition of claim 10 wherein said polyepoxide is a mixture of a glycidyl polyether of tetrabromo bisphenol A and a glycidyl polyether of a polyhydric phenol.

13. The composition of claim 10 wherein said unsaturated carboxylic acid is a hydroxyalkyl acrylate or methacrylate half ester of an ethylenically unsaturated dicarboxylic acid.

14. The composition of claim 13 wherein said half ester is a hydroxyethyl acrylate half ester of maleic acid.

15. The composition of claim 10 wherein said unsaturated carboxylic acid is acrylic acid.

16. The composition of claim 10 wherein said unsaturated carboxylic acid is the anhydride of maleic acid.

17. The composition of claim 10 wherein R of said phosphate ester is hydrogen, $R_1$ is —$CH_2CH_2$—, $R_2$ is —$CH_2CH_2$—, $x$ is 2 and $y$ is 1.

18. The composition of claim 17 wherein $x$ is 1 and $y$ is 2.

19. The composition of claim 10 wherein said monomer is styrene, methyl methacrylate, or a mixture of styrene and methyl methacrylate.

References Cited

UNITED STATES PATENTS

| | | | |
|---|---|---|---|
| 2,831,838 | 4/1958 | Fekete | 260—80 |
| 2,849,418 | 8/1958 | Fang | 260—836 |
| 3,346,545 | 10/1967 | Sehm | 260—80 |

PAUL LIEBERMAN, Primary Examiner

U.S. Cl. X.R.

260—18, 22, 23, 47, 78.4, 80, 836, 837, 861, 952